United States Patent

Hora et al.

[11] Patent Number: 5,319,688
[45] Date of Patent: Jun. 7, 1994

[54] PNEUMATIC SAFETY EQUIPMENT TO PREVENT THE OVERHEATING OF NUCLEAR REACTORS

[76] Inventors: Heinrich W. Hora, Weslfenstrasse No. 4, Poing 811, Fed. Rep. of Germany; George H. Miley, 103 S. Goodwin, Urbana, Ill. 61801

[21] Appl. No.: 936,033

[22] Filed: Aug. 26, 1992

Related U.S. Application Data

[63] Continuation-in-part of Ser. No. 664,457, Mar. 1, 1991, abandoned.

[51] Int. Cl.⁵ .................................................. G21C 7/22
[52] U.S. Cl. .................................... 376/331; 376/336; 376/367
[58] Field of Search ............... 376/331, 336, 329, 337, 376/219, 367; 165/32 H

[56] References Cited

U.S. PATENT DOCUMENTS

| | | | |
|---|---|---|---|
| 2,919,236 | 12/1959 | Zinn | 376/331 |
| 2,987,455 | 6/1961 | Huston et al. | 376/331 |
| 3,629,068 | 12/1971 | Lantz et al. | 376/331 |
| 3,712,053 | 1/1973 | Kofink | 165/32 H |
| 3,866,424 | 2/1975 | Busey | 376/367 |
| 3,933,198 | 1/1976 | Hara et al. | 165/32 H |
| 3,935,063 | 1/1976 | Dunckel | 376/367 |
| 4,279,697 | 7/1981 | Overhoff et al. | 376/336 |
| 5,195,575 | 3/1993 | Wylie | 376/367 |

FOREIGN PATENT DOCUMENTS

| | | | |
|---|---|---|---|
| 1139216 | 11/1962 | Fed. Rep. of Germany | 376/331 |
| 1204346 | 11/1965 | Fed. Rep. of Germany | 376/336 |
| 2261596 | 9/1975 | France | 376/331 |
| 1467357 | 3/1989 | U.S.S.R. | 165/32 H |

*Primary Examiner*—Behrend E. Harvey
*Attorney, Agent, or Firm*—Chernoff, Vilhauer, McClung & Stenzel

[57] ABSTRACT

A pneumatic safety system for a nuclear reactor includes a containment vessel containing $He_3$ at high pressure communicating with a nuclear core by way of a conduit system which includes hollow pipes situated adjacent rods of fissionable material inside the core area. A rupturable diaphragm is interposed in the conduit system and is connected by a plurality of heat-pipes to the core area. The heatpipes respond to changes in core temperature and at a critical temperature cause the diaphragm to rupture thus allowing neutron absorbing gas under high pressure to quickly flood the core shutting down the nuclear reaction.

6 Claims, 3 Drawing Sheets

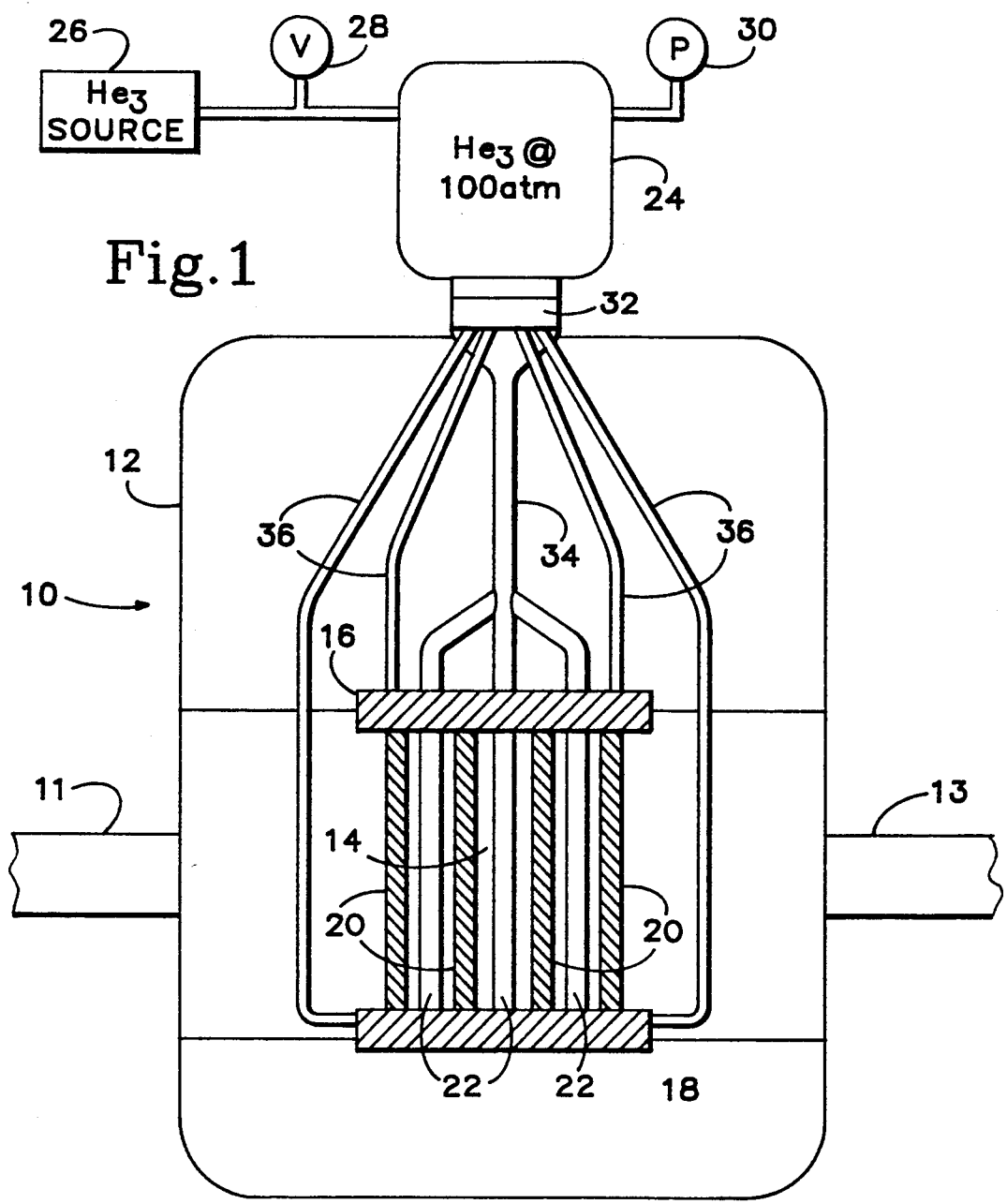
Fig. 1
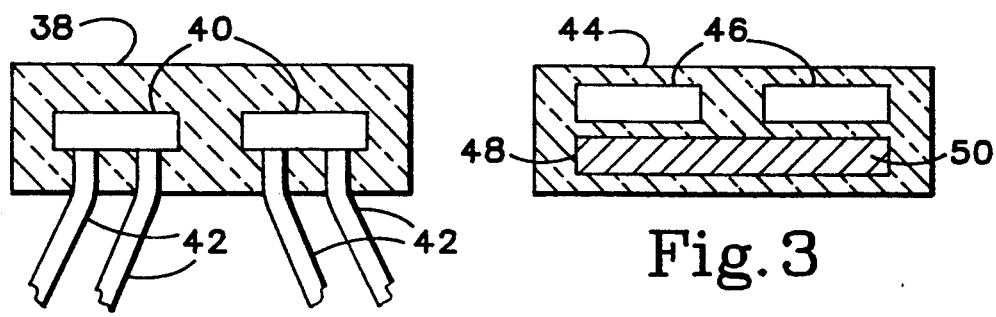
Fig. 2
Fig. 3

PNEUMATIC SAFETY EQUIPMENT TO PREVENT THE OVERHEATING OF NUCLEAR REACTORS

The following application is a continuation-in-part of our co-pending application Ser. No. 07/664,457, now abandoned.

BACKGROUND OF THE INVENTION

This invention relates to a method and apparatus for preventing overheating or core meltdown in a nuclear reactor.

A nuclear reactor based on the fission of heavy atomic nuclei must be kept within a relatively slowly controllable thermal equilibrium even in a compact impulse operation. At the transition from a noncritical (nonexothermal) state into a critical state the overheating of the reactor is usually prevented by a controlled removal of the heat by exchangers which drive heat engines or by the use of nutron absorbing rods.

Absorbing rods are usually made of boron or boron containing compounds, hermetically sealed in containers made of high temperature resistant materials and welded by electron beams. Since the injection of the rods into the reactor occurs relatively slowly, powered by remotely controlled motors, the slowly varying conditions of equilibrium may be maintained as long as equilibrium exists. The velocities of the motion of the rods inward and outward are well within a wide range of an accepted safety scale allowing for mechanical interruptions or friction of the rods, such that a largest acceptable accident (GAU) is kept very small. Difficulties, however, can appear, especially in those cases when, as in Chernobyl in 1986, safety circuits fail or are eliminated. Overheating may then result because the absorbing rods are not driven into the core fast enough. Another example is the well known Three Mile Island accident which could have been prevented if faster absorbing rod insertion could have been provided.

Because the insertion of absorbing rods is relatively slow, other systems employing gases or fluids for flooding the reactor core with neutron absorbing materials have been proposed. One example is shown in Overhoff et al., U.S. Pat. No. 4,279,697 in which a controller controls valves for flooding the reactor core with aqueous gadolinium acetate which is housed in a supply vessel separate from the core. The problem with the Overhoff system is that it is partially dependent upon valves which must be opened in order to flood the reactor core. A passive link to the reactor core is provided which includes a fusible element located in a tube entering the reactor core, however, the fusible element is located so far from the core that the critical temperature in the core will be exceeded before the fusible element melts. A second problem is, that although the gadolinium acetate solution can be pumped into the core faster than boron rods can be inserted, the speed of an aqueous solution may still be too slow to prevent overheating.

A second approach is proposed in patents to Zinn, U.S. Pat. No. 2,919,236 and in Huston et al., U.S. Pat. No. 2,987,455. In the Zinn device a pipe is located within the reactor core that includes two compartments. The compartments are separated by a meltable fuse so that $He_3$ gas stored in an upper compartment outside the core area can flow into the lower compartment, which is inside the core, absorbing neutrons and slowing the reaction. The problem with the Zinn device is that the meltable fuse is located too far from the core to react fast enough to a sudden increase in core temperature and melt effectively before the critical temperature is exceeded.

This problem is dealt with somewhat in Huston et al. which includes a number of pellets which include a dual chamber design. One chamber includes $He_3$ gas under pressure and the other chamber is to allow for the expansion of the $He_3$ gas into a larger volume when the fuse melts. This increases the neutron absorbing volume of the gas when the critical temperature is reached. This type of safety device, if used, is for use with a reactor that uses similarly sized fuel slugs such as a Hanford-type reactor. It is not suitable for use in a reactor which uses elongate fuel rods. Furthermore, the slugs may fail, subjecting the core to cool down at inappropriate times, or require core shutdown so that the slugs may be replaced periodically.

SUMMARY OF THE INVENTION

The present invention provides a passive safety system for a nuclear reactor in which $He_3$ gas is stored in a pressure storage vessel located remotely from the reactor core. The storage vessel is connected to the core by a conduit extending from the pressure vessel and containing a meltable diaphragm lodged therein adjacent the storage vessel. The diaphragm is thermally coupled to the core area by a series of heat pipes which are connected to support plates housing the core. The support plates act as heat sinks for the core and transmit heat to the heat pipes which are highly thermally conductive. Thus, rapid changes in temperature in the core are transmitted immediately via the heat pipes to the meltable diaphragm causing it to melt and allowing $He_3$ gas under pressure to flood a series of hollow pipes or cylinders located within the core thereby slowing down the reaction.

Alternatively, the diaphragm may be made of rupturable material and may include imbedded explosive charges thermally coupled to the heat pipes which explode and cause it to rupture thereby allowing helium to enter the core via the conduit.

The meltable diaphragm may also dispense with the heat pipes by including a pocket or chamber adjacent the explosive charges filled with a heat sensitive material of lower tensile strength than the diaphragm, but having a melting point below the critical temperature. The heat released upon melting of this material may trigger the explosive charges which in turn rupture the diaphragm.

With all three embodiments of the invention, reaction time is very fast when the core reaches a critical temperature. Furthermore, the use of $He_3$ under pressure ensures that the neutron absorbing gas will be displaced into the core area at sonic speeds. This is much faster than either solids or liquids can be inserted into the core area.

It is a primary object of this invention to provide a passive safety system for the rapid overheating of nuclear reactors.

A further object of this invention is to provide a passive safety system for nuclear reactors which can react to an overheating incident in the reactor at much greater speed than heretofore possible.

Yet a further object of this invention is to provide a safety system which includes a meltable or fracturable diaphragm that can be ruptured very quickly when the reactor core reaches a critical temperature.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a side elevation cutaway view of a simplified nuclear reactor employing the present invention.

FIG. 2 is a side cutaway elevation view of a meltable or fracturable diaphragm for use in the system of FIG. 1 employing explosive charges thermally coupled to heat pipes.

FIG. 3 is an alternative embodiment of the diaphragm of FIG. 2 employing a diaphragm containing a rapidly melting heat sensitive material for triggering explosive charges imbedded in the diaphragm.

DETAILED DESCRIPTION OF THE PREFERRED EMBODIMENT

Figure 4:
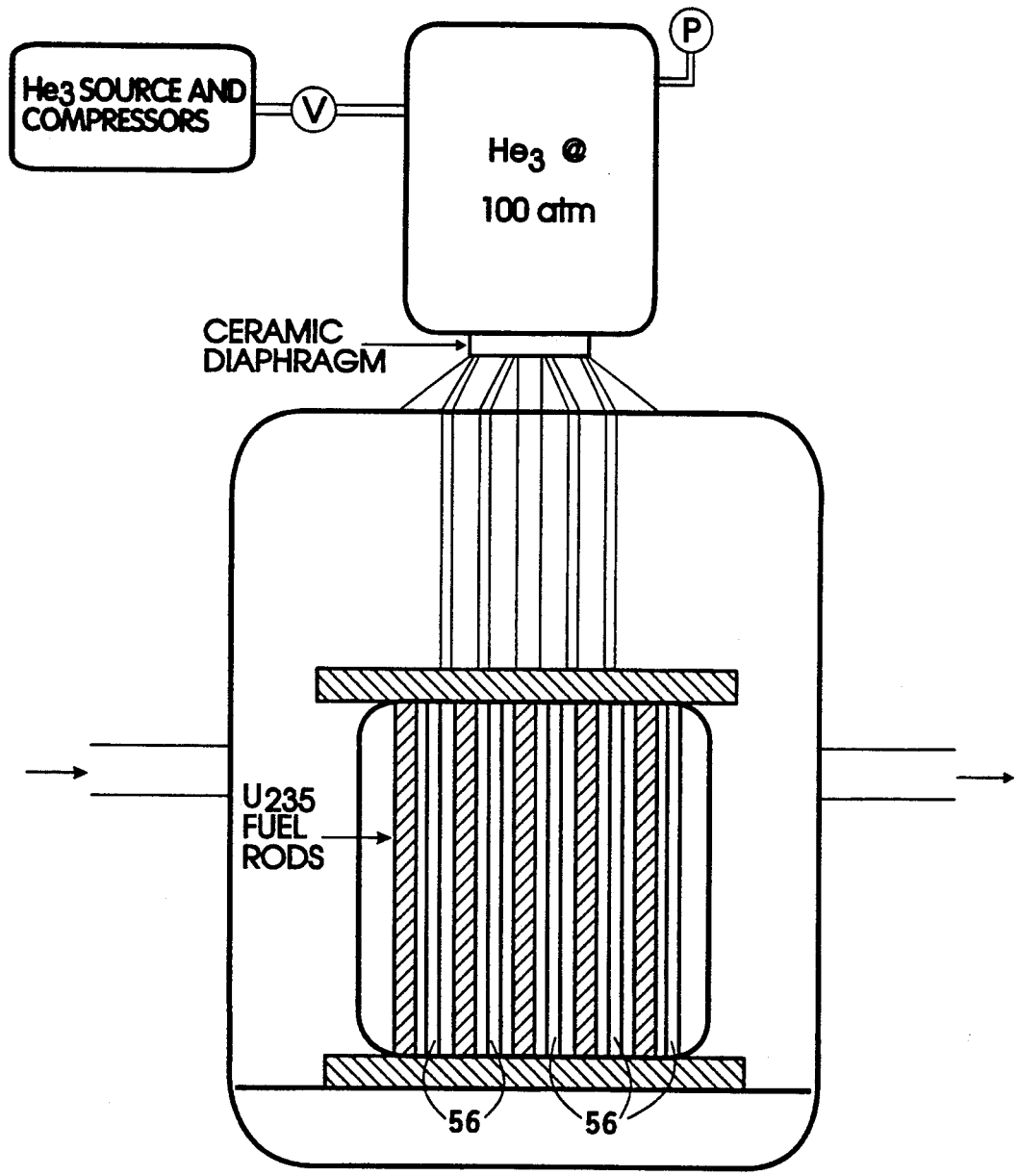
FIG. 4 is a schematic view of an alternative embodiment of the invention employing a ceramic diaphragm and porous $He_3$ diffusion tubes in the reactor core.

Referring now to FIG. 1, a nuclear reactor 10 includes a core containment vessel 12 which houses a nuclear core indicated generally by 14. As is conventional, a heat exchange medium flows into and out of the containment vessel 12 through inlet and outlet pipes 11 and 13, respectively. It will be understood that the precise operating structure of the reactor is not germane to the invention and the details thereof have been omitted since such details are well known to those skilled in the art.

The nuclear core 14 comprises an upper support plate 16 and a lower support plate 18. Journaled into the support plates are a plurality of rods 20 made of fissionable material such as uranium. A series of hollow cylindrical pipes 22 extend through the upper support plate 16 and are dispersed among the rods of fissionable material 20 inside the core 14. Typically, a core may consist of about 100 rods of fissionable material, and for this number there should be about 10 pipes 22 dispersed evenly among the rods 20. The pipes 22 all branch off a conduit 34.

A pressure vessel 24 is affixed to the top of the core containment vessel 12. The pressure vessel 24 is charged with a neutron absorbing gas, preferably $He_3$, by a $He_3$ source 26 coupled to the pressure vessel 24 through a valve 28. The pressure in the pressure vessel 24 should be maintained at a pressure of around 100 atmospheres. Pressure this high is necessary in order to cause the helium to flood the core area 14 at close to the speed of sound. The pressure in the vessel 24 is monitored by a meter 30.

The neck of the pressure vessel 24 leading into the core containment vessel 12 includes a meltable diaphragm 32. The conduit 34 is connected to the vessel 24 at its neck and feeds into the core through pipes 22.

A plurality of heat pipes 36 are thermally connected to the diaphragm 32 and extend inside the core containment vessel 12 to either the upper support plate 16 or the lower support plate 18. The heat pipes 36 are highly thermally conductive, and such devices are often used as heat sinks and as heat transfer mediums. In this case they are used because of their high degree of thermal conductivity. The upper ends of the heat pipes 36 are imbedded in the meltable diaphragm 32 and the lower ends are imbedded in or affixed to the upper or lower support plates. While four such heat pipes have been shown in the drawing of FIG. 1, it should be understood that a fairly large plurality of heat pipes could be used. The object of the heat pipes is to quickly transfer thermal energy from the support plates and the enclosed core area 14 to the diaphragm 32 causing it to melt. The support plates are themselves highly thermally conductive and are approximately the same temperature as the hottest portion of the core area 14.

If the core exceeds what is determined to be a critical temperature the heat pipes transfer enough energy to the diaphragm fast enough to melt the diaphragm 32 and allow $He_3$ gas to quickly flood the core 14 shutting down the reaction. This system is completely passive in that it does not require an operator to notice or sense that a temperature overload is about to occur or is in fact occurring. Shutdown is automatic and happens very quickly once the critical temperature is reached. The diaphragm 32 is fabricated from a material that has enough tensile strength to withstand 100 atm of pressure in the vessel 24 yet will quickly melt at the critical temperature.

Figure 4A:
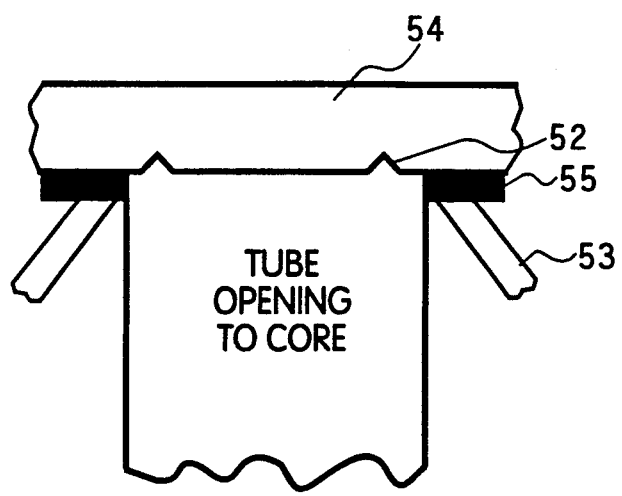
FIG. 4(a) is a partial side schematic view of the ceramic diaphragm used in FIG. 4.

Referring to FIGS. 4 and 4(a), one example of a material acceptable for this purpose is mullite, an aluminum oxide and silicon dioxide compound that melts at 1500°-2000° C. Typical core temperatures are around 2000° C. so a diaphragm can be fabricated that will melt when the core temperature exceeds its normal operating temperature by about 10%. The melting temperature can be adjusted over this range by varying the stoichiometric composition of the ceramic. The configuration for the diaphragm 54 shown in FIG. 4 and FIG. 4(a) incorporates an annular groove around its circumference. The diaphragm is supported on a metal ring 55 that is thermally coupled to heat pipes 53 leading into the core. This design, combined with the proper ceramic composition and the temperature gradient that is developed under accident conditions, causes an explosive breaking of the diaphragm immediately following onset of melting. This explosive behavior is to be distinguished from the characteristic yielding behavior of metals and many other materials under such conditions. Consequently, the neutron absorbing gas is released into the network of porous tubes 56 in the core very rapidly.

Because of the relatively high atmospheric pressure in the vessel 24 it may be necessary to employ a material which has a fairly high tensile strength. In such cases the embodiments of FIG. 2 and FIG. 3 may be employed. In FIG. 2 a fracturable or meltable diaphragm 38 includes imbedded explosive charges 40. The explosive charges are coupled to heat pipes 42 which are deployed in the manner shown in FIG. 1. The heat pipes 42 transfer heat quickly to the explosive charges 40 which explode at the critical temperature fracturing and/or melting the diaphragm 38.

Yet another embodiment of the invention is shown in FIG. 3. In this embodiment a diaphragm 44 also includes explosive charges 46 imbedded therein. Instead of heat pipes, however, in this embodiment a chamber 48 is provided in the diaphragm which houses a meltable material 50 situated near or in contact with the explosive charges. This material is designed to melt at about 100° C. below the critical temperature. The chamber 48 may have apertures that expose the explosive charges to the core when the material 50 melts. Because the material 50 melts at a lower temperature, heat transfer to the explosive charges 46 can be complete by the time the core 14 reaches the critical temperature. This will cause the explosives to ignite at the critical temperature ensuring that core shutdown will occur at this point in time.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a nuclear reactor containing a reactor core, a safety system for slowing down a nuclear reaction in the core when the core reaches a predetermined critical temperature, comprising:
   (a) a reactor core containment vessel housing the reactor core;
   (b) said reactor core including rods or bars of fissionable material;
   (c) a container of neutron absorbing gas situated outside the core containment vessel and including a conduit extending into the core containment vessel;
   (d) a plurality of porous hollow tubes situated inside the core adjacent the rods of fissionable material and connected to the conduit; and
   (e) a rupturable diaphragm made from a material which ruptures at said critical temperature interposed in said conduit between said core containment vessel and said container, said diaphragm being thermally connected to the reactor core by a plurality of heat pipes extending into the reactor core from a thermally conductive member contacting the diaphragm, whereby heat from the core is transmitted through the heat pipes to the member causing the diaphragm to rupture at said critical temperature.

2. The safety system of claim 1 wherein said rods or bars of fissionable material are supported by at least one support plate and said heat pipes are affixed to said support plate.

3. The safety system of claim 1 wherein the diaphragm includes an annular groove and said member comprises a ring contacting the diaphragm radially outwardly of said groove.

4. The safety system of claim 1 wherein the rupturable diaphragm is made of ceramic material.

5. The safety system of claim 3 wherein the rupturable diaphragm is made of mullite.

6. The safety system of claim 1 wherein the neutron absorbing gas is $HE_3$.

* * * * *